No. 611,167. Patented Sept. 20, 1898.
J. W. BODLEY.
APPARATUS FOR UNLOADING SUGAR CANE FROM CARS, &c.
(Application filed Jan. 27, 1898.)
(No Model.) 2 Sheets—Sheet 2.
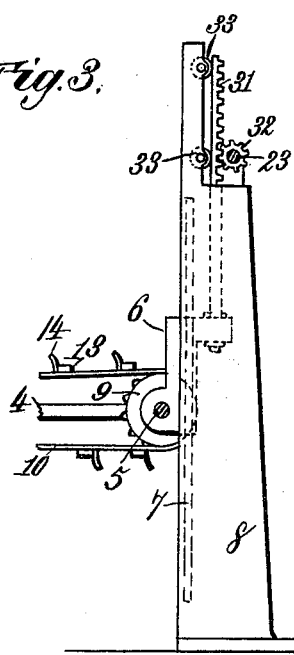
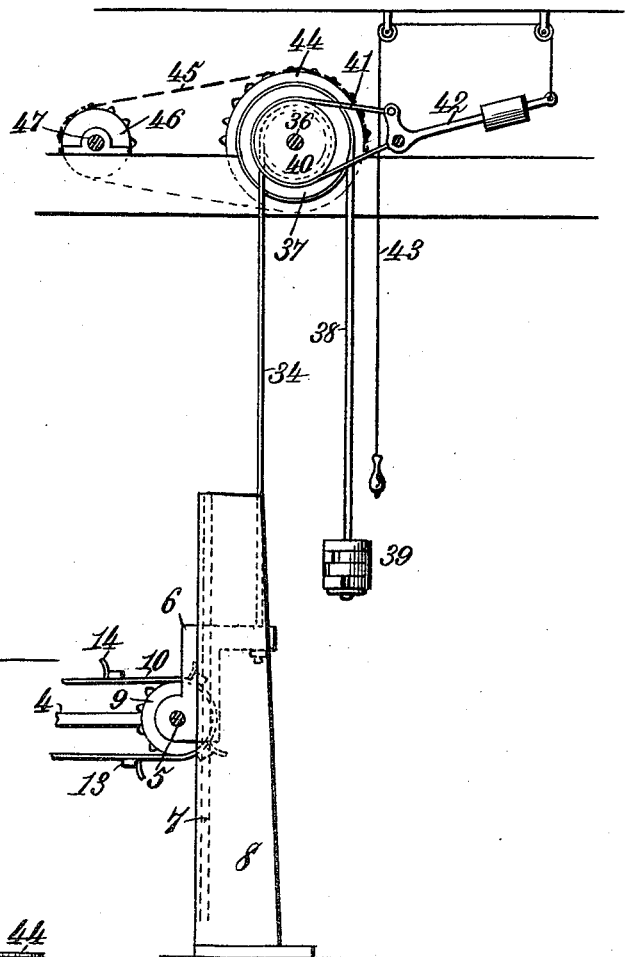
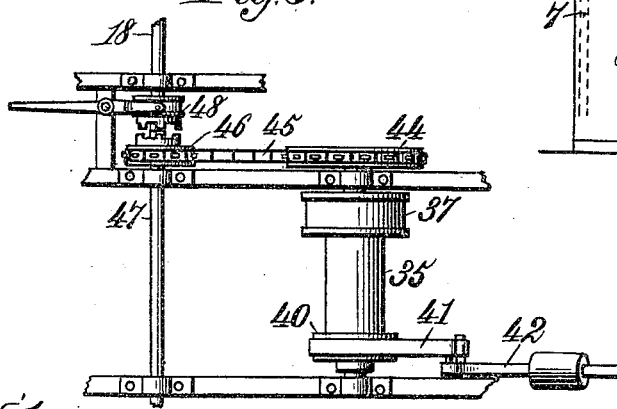
Witnesses.
Inventor.
James W. Bodley,
By James L. Norris
Att'y.

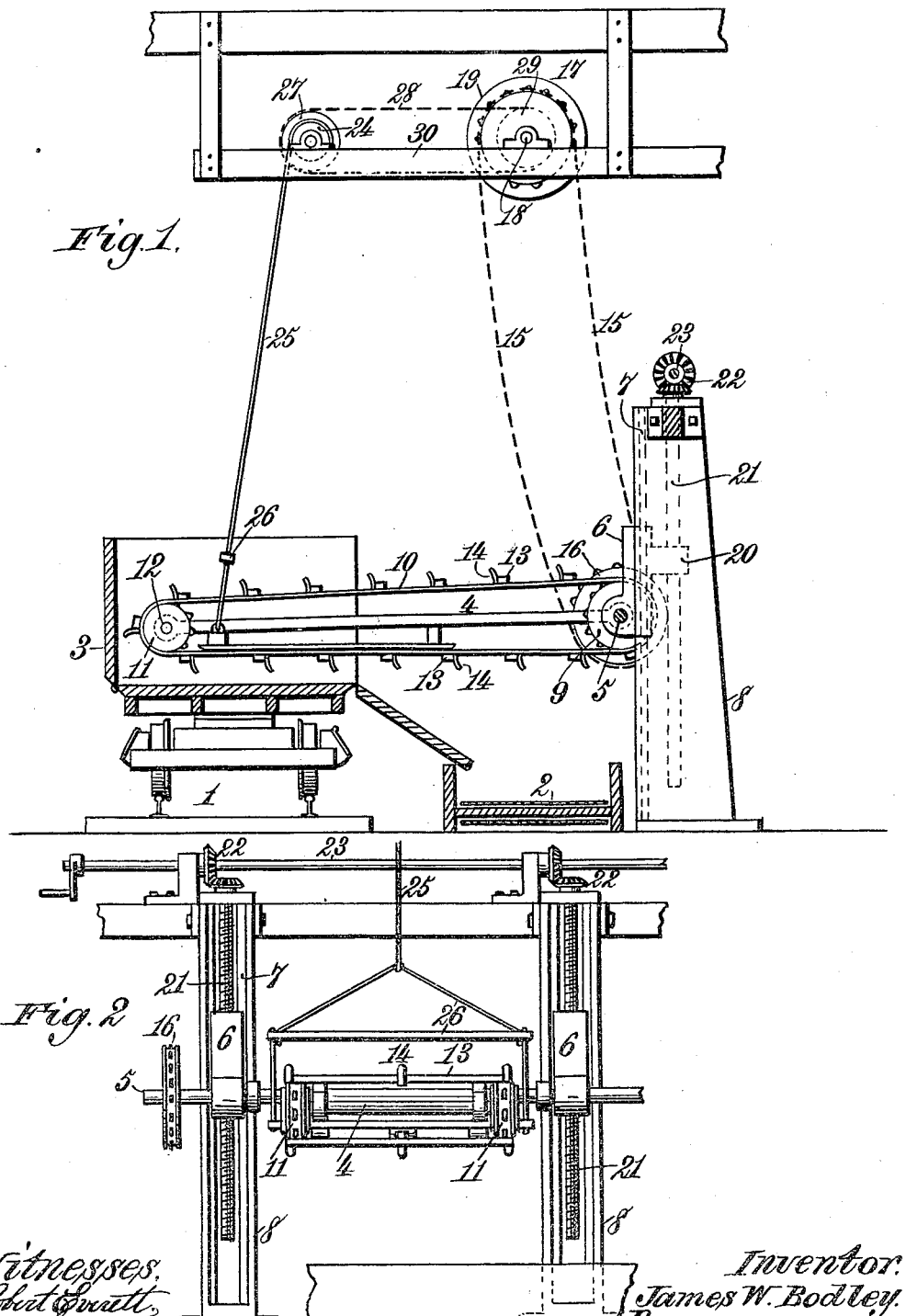

UNITED STATES PATENT OFFICE.

JAMES W. BODLEY, OF STAUNTON, VIRGINIA.

APPARATUS FOR UNLOADING SUGAR-CANE FROM CARS, &c.

SPECIFICATION forming part of Letters Patent No. 611,167, dated September 20, 1898.

Application filed January 27, 1898. Serial No. 668,188. (No model.)

*To all whom it may concern:*

Be it known that I, JAMES W. BODLEY, a citizen of the United States, residing at Staunton, in the county of Augusta and State of Virginia, have invented new and useful Improvements in Apparatus for Unloading Sugar-Cane from Cars, &c., of which the following is a specification.

This invention relates to apparatus for handling sugar-cane and the like in unloading the same from cars or elsewhere or for removing such material from a platform or from the ground and depositing it onto a cane-carrier for convenient transport to the mill or other place.

My invention consists in an apparatus composed of an endless rake or series of rake-sections having a supporting and driving shaft at one end, vertically-movable carriages in which said shaft is journaled, standards having vertical guideways for said carriages, and operating mechanism connected with said carriages for simultaneously actuating the same to raise and lower the said rake, as required.

The invention is illustrated in the annexed drawings, in which—

Figure 1 is an end elevation of a car-unloading apparatus, showing a vertically-movable rake-shaft carriage arranged for operation by means of screw-gearing. Fig. 2 is a front elevation of the same. Fig. 3 is a view showing the rake-shaft carriage as operated by rack-and-pinion gearing. Fig. 4 is a side elevation showing the vertically-movable rake-shaft carriage as operated by means of counterbalance-gearing with clutch and friction brake. Fig. 5 is a plan of the same.

In Fig. 1 of the drawings the reference-numeral 1 designates a railway-track parallel with and adjacent to a conveyer or carrier 2 for transporting sugar-cane to a mill or other place. It is usual to pile sugar-cane lengthwise in a cart or car 3 for transportation from the field to any required place of deposit—as, for instance, upon a cane-carrier 2, leading into a sugar-mill. The cane-stalks are of irregular lengths, slippery, heavy, and not easy to handle except in small quantities and very slowly. It is therefore desirable to employ an automatic car-unloading apparatus, such as an endless rake 4 or series of rake-sections, adapted to be lowered onto the cane in a car after one side of the car has been let down or removed. By operating the endless rake 4 the sugar-cane will be pulled off onto the cane-carrier 2 and be thereby conveyed to the sugar-mill.

The endless rakes or rake-sections 4 each comprise a frame that is pivoted onto a horizontally-arranged shaft 5, journaled in a vertically-movable carriage 6, which is capable of adjustment along a vertical guideway 7, provided on a support or standard 8, that may form part of the framework of the car-unloading apparatus. To the shaft 5 are secured sprocket-wheels 9, that connect by sprocket-chains 10 with sprocket-wheels 11 on a shaft 12 at the other end of each rake-frame. The chains 10 support and carry a number of transversely-arranged slats or bars 13, each of which is provided with series of slightly-curved rake-teeth 14 for dragging off the cane or stalks contained in a car-load. In this manner the stalks of sugar-cane are easily deposited onto the cane-carrier 2, that conveys them into the sugar-mill.

It will be obvious that the rake-operating shaft 5 may be driven in any suitable manner or from any convenient source of power applied, say, through an endless chain or belting 15 to a sprocket wheel or pulley 16 on the rake-shaft 5, the said driving-chain to take its motion from a sprocket wheel or pulley 17 on an overhead shaft 18, provided with a pulley or band-wheel 19, to be driven, preferably, from the same power that actuates the endless cane-carrier 2, the engine or motor (not shown) being conveniently located at the mill.

For the purpose of lowering the endless rake into operative position for use in unloading cane from a platform or car and then to lift the rake away from the emptied car there may be formed on each vertically-movable carriage 6 a nut 20, engaged with a vertically-supported screw-shaft 21, a series of which may be conveniently operated through bevel-gearing 22 from a horizontally-arranged shaft 23, Figs. 1 and 2, that can be actuated by any suitable means—as, for instance, a crank or a hand-wheel. Each rake-operating shaft 5 may be mounted in two vertically-movable carriages 6, Fig. 2, adjusted or actuated by means of two vertical screw-shafts 21 for raising and lowering the rake, as shown.

There may be also provided a hoisting-drum 24, Fig. 1, connected by a rope 25 to a bail 26 on the forward end of the rake-frame. On the drum-shaft there is a sprocket-wheel 27, connected by chain belting 28 with a sprocket-wheel 29, that can be clutched to the shaft 18 when it is desired that the hoisting-drum 24 shall be operated to assist the screw-shafts 21 in lifting the rake. The rope 25 assists in supporting the rake-frame in a plane at right angles to the vertically-movable carriage. The hoisting-drum and the main driving-shaft 18 may be mounted in any suitable overhead frame 30, as shown.

Instead of operating the vertically-movable rake-shaft carriage 6 by means of a screw or screws it may be provided with a vertically-extended rack or racks 31, Fig. 3, actuated by means of a pinion or pinions 32 on a shaft 23, that can be rotated by any suitable means in the proper direction to raise or lower the rake, as may be required. If desired, anti-friction-rollers 33 may be provided at any needed points to afford proper bearing for the rack or racks.

In Fig. 4 the vertically-movable rake-shaft carriage 6 is shown as having one end of a hoisting-rope 34 secured thereto. This rope 34 is wound onto a hoisting-drum 35, Fig. 5, supported on a shaft 36, mounted in the overhead frame 30. On one end of the drum 35 there may be a pulley 37, having wound thereon a rope 38, Fig. 4, carrying a weight or weights 39 at its free end. The other end of the hoisting-drum 35 is provided with a brake-wheel 40, having thereon a friction brake-band 41, connected with a weighted brake-lever 42, to which an operating-cord 43 is attached. On the shaft 36 there is a sprocket-wheel 44, connected by means of a chain belt 45 with a sprocket-wheel 46 on a shaft 47, that is adapted to be clutched with the main driving-shaft 18, from which the endless rake is actuated. When the clutch 48 is thrown so as to cause the transmission of power from the main driving-shaft 18 to the shaft 47 and thence to the shaft 36, the drum 35 will be rotated to wind the rope 34 and thereby lift the carriage 6 and attached rake. As soon as the rake 4 has been sufficiently elevated the shafts 18 and 47 should be unclutched. The friction brake-wheel 40, with its band 41 and weighted lever 42, will sustain the rake in an elevated position. Now if it is desired to lower the rake the cord 43 will be pulled, thus releasing the brake and allowing the rake to descend against the retarding action of the counterweights 39, that will prevent a too rapid descent of the rake onto the load in a car.

When the vertically-movable rake-shaft carriage 6 has been actuated or adjusted in such manner as to lift the endless rake 4 out of the way, a loaded car may be brought up at the side of the endless and continuously-traveling cane-carrier 2 in position to be unloaded. The rake may now be lowered onto the cane in the open-top car, its side next to the cane-carrier having been let down or removed, and the endless rake being now put into operation the sugar-cane will be raked or pulled off onto the cane-carrier and be thereby conveyed into the mill. An attendant can easily control the rake, so that it will gradually descend with the load as it is raked off.

If desired, the car-unloading rake mechanism may be duplicated for convenient employment in conjunction with railway-tracks on both sides of the cane-carrier 2, thus avoiding loss of time and labor that would be incurred in removing an unloaded car, bringing up a full car on the same track, opening it, and making all other required preparations between the operations of unloading successive cars on one track.

Obviously various forms of mechanism may be provided for operating the vertically-movable carriage 6, in which is journaled or carried the driving-shaft 5 of the endless rake 4, and it will be apparent that by the provision of such a vertically-movable carriage for supporting the rake-shaft the car-unloading apparatus can be easily adjusted to the requirements of cars of varying height and to other circumstances attending the unloading and feeding of an unwieldly material, such as sugar-cane or the like. The attachment of the rake to a vertically-movable carriage will also permit the ready removal of cane onto the carrier direct from the ground or from a platform adjacent to said carrier.

What I claim as my invention is—

The herein-described apparatus for handling sugar-cane, and the like, consisting of an endless rake, or series of rake-sections, having a supporting and driving shaft at one end, vertically-movable carriages in which said shaft is journaled; standards having vertical guideways for said carriages, and operating mechanism connected with said carriages for simultaneously actuating the same to raise and lower the said rake, as specified.

In testimony whereof I have hereunto set my hand in presence of two subscribing witnesses.

JAMES W. BODLEY.

Witnesses:
JNO. J. WARD,
M. J. SIMMS.